United States Patent [19]

Johanson et al.

[11] Patent Number: 4,646,910

[45] Date of Patent: Mar. 3, 1987

[54] GENERALIZED HIGH SPEED BELT TO BELT TRANSFER CHUTE

[75] Inventors: Jerry R. Johanson; David S. Dick, both of San Luis Obispo, Calif.

[73] Assignee: Jenike & Johanson, Inc., N. Billerica, Mass.

[21] Appl. No.: 762,492

[22] Filed: Aug. 5, 1985

[51] Int. Cl.[4] .................... B65G 47/20; B65G 47/44
[52] U.S. Cl. .................................. 198/535; 198/560; 198/569; 406/193
[58] Field of Search ................. 198/560, 569, 535; 193/15, 16, 22; 406/193

[56] References Cited

U.S. PATENT DOCUMENTS

| | | | |
|---|---|---|---|
| 396,500 | 1/1889 | Macdonald | 198/560 |
| 464,530 | 12/1891 | States et al. | 198/535 |
| 663,150 | 12/1900 | Conner | 193/16 |
| 778,699 | 12/1904 | Nelson | 198/535 |
| 923,064 | 5/1909 | Morenus | 198/535 |
| 3,057,454 | 10/1962 | Frasch et al. | 198/535 |
| 3,171,534 | 3/1965 | Oury | 198/569 |
| 3,807,540 | 4/1974 | Boulet | 193/16 |
| 4,479,743 | 10/1984 | Stahl | 406/193 |

FOREIGN PATENT DOCUMENTS

| | | | |
|---|---|---|---|
| 245481 | 6/1965 | Austria | 198/535 |
| 474934 | 7/1951 | Canada | 198/535 |
| 1271020 | 6/1968 | Fed. Rep. of Germany | 198/560 |
| 1965300 | 7/1971 | Fed. Rep. of Germany | 198/535 |
| 648488 | 2/1979 | U.S.S.R. | 198/535 |
| 695922 | 11/1979 | U.S.S.R. | 406/193 |

Primary Examiner—Joseph E. Valenza
Assistant Examiner—Daniel R. Alexander
Attorney, Agent, or Firm—Kenway & Jenney

[57] ABSTRACT

A high speed belt to belt transfer chute useful in handling, without modification or adjustments, material ranging from sticky clay and fine dust to large rocks. The generalized chute is designed either to bend the material flow to the vertical after it has left a leading belt or, conversely, to direct material moving vertically downward into the direction of a following belt. The chute is constructed of individually replaceable, ribbed elements, which may be repositioned and replaced as they wear in order to maintain the same directed, controlled flow of material, while minimizing the replacement cost and downtime. A two-unit chute may be constructed with an upper unit for transferring material from a conveying belt to a second, lower unit which transfers the material onto a following belt, with the vertical distance between them fixed so that the energy lost by the material in friction and impact on both units may be made up in gravitational acceleration between the belts, thereby maintaining the speed of solids and the rate at which the materials are deposited onto the following belt.

13 Claims, 7 Drawing Figures

GENERALIZED HIGH SPEED BELT TO BELT TRANSFER CHUTE

BACKGROUND OF THE INVENTION

Various studies have been made on flow of material through transfer chutes. Due to the complex nature of analyzing such flow, most theoretical work has been confined to cohesionless, granular materials, and steady state flow conditions. This work is generally considered to be more academic than practical since most materials handled in high speed belt-to-belt transfer chutes do not fall into the category of "cohesionless granular". It is not uncommon to find chutes designed to be modified or redesigned empirically by the operator in the field to achieve the performance criteria.

Chute designs generally call for abrasion-resistant lip liners and/or rock boxes to minimize wear. These approaches to the wear problem either tend to require large amounts of head room or do not accelerate the flowing material in the direction of the following belt. It is also often difficult to handle sticky materials with these chutes, and modifications have to be made to account for changes in material properties. The problem of dust generated at transfer points is another problem traditionally dealt with by conditioning the material and/or providing dust collection equipment.

An object of the present invention is to provide a chute designed to minimize wear of the chute by decreasing the amount of exposed steel, providing easily replaced high wear sections and high impact areas.

Another object of the present invention is to provide a transfer chute which can handle a range of material from extremely sticky clay to large rocks or particulate matter in such a way that it will not adhere to the walls or block the chute.

Another object of the present invention is to provide a chute which can accelerate the material in the direction of, and place the load in the center of, a following belt, thereby minimizing whirling and bouncing of particulate material and belt wear.

A still further object of the present invention is to provide a chute whereby materials flowing through the chute may be handled with minimum impact or sudden changes in momentum to minimize air entrainment and dusting.

Yet another object of the present invention is to provide a chute whose operation is independent of the angle between the leading and the following belts.

SUMMARY OF THE INVENTION

The present invention is a transfer chute comprising a plurality of replaceable ribbed elements sequentially shiftable along a support structure wherein each element starts with a predetermined shape and wears progressively while being moved in successive steps along the support structure. The configuration of the assembled elements forms the desired shape for directing the material stream, rotating the stream to or from the vertical and downward on the support structure to optimally distribute wear by the material upon the chute. The elements are ribbed to create a rock box-type sliding surface for the material being transferred that minimizes wear while directing the stream of solids with a minimum of impact.

A two stage transfer system may be constructed in which a first transfer chute receives incoming material from the end of a conveying belt, directs the material into a curved path which at the entrance to the chute is essentially tangential to the trajectory of the initially free-falling material, and gradually changes the direction of the stream of materials to the vertical so that the materials maintain their momentum. This reduces the tendencies of the chute to clog with sticky solids or to entrain air in the case of dusting materials. The second or lower transfer chute is placed in a vertical relationship to the upper transfer unit so as to maintain the material speed and by similar means to direct the material towards a following belt.

Features of the present invention include the elements comprising the chute or chutes shaped and positioned to distribute the stream of material essentially at the receiving belt velocity onto the receiving belt center line, to perform a continuous bending and directing of the material stream toward the direction of movement of the receiving belt, to be movably mounted on the support structure so that worn elements may be replaced sequentially in the field without total disassembly of the chute, and to provide as rapid and efficient operation as possible.

DETAILED DESCRIPTION OF THE INVENTION

Figure 1:
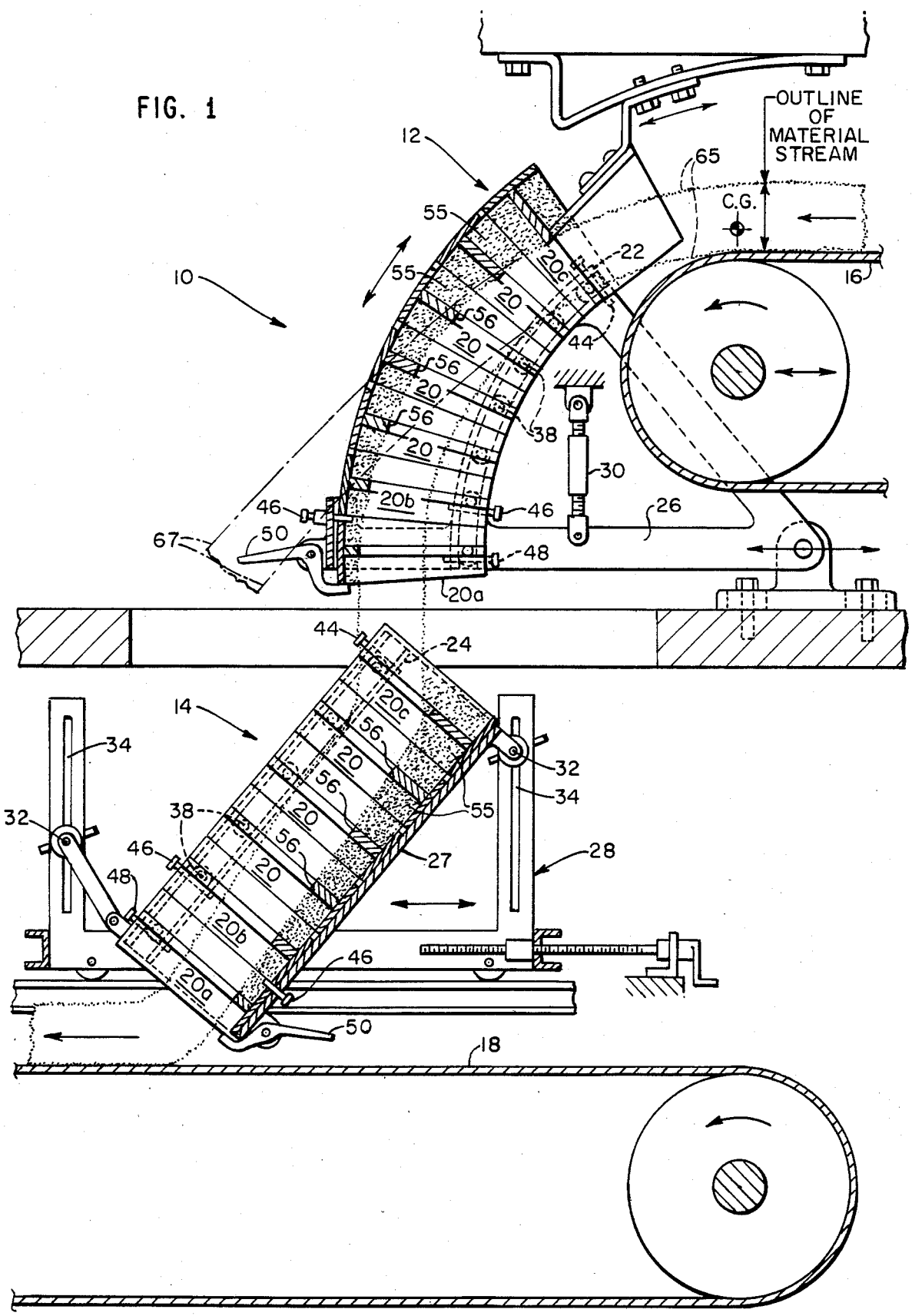
FIG. 1 is a side elevation of a two-chute transfer system for directing the material from a conveying belt to a following belt.

The generalized chute is designed to bend the flow of material from the generally horizontal direction in which it is traveling on a belt or conveyor to the vertical, or from the vertical to the generally horizontal direction of a following belt or conveyor. In one embodiment, a curved upper chute is placed at one end of a conveying belt where it receives the material to be transferred, altering the direction of the material so that it leaves the chute in a generally vertical direction. A second chute is placed at the lower end of the upper curved chute, where it receives the material and transfers it onto a receiving belt. The combination of the two chutes is effective to alter the direction of movement of the material to be transferred by any angle which may be subtended between the directions of respective belts.

Each transfer chute consists of a plurality of ribbed steel elements, generally of rounded V-shape on the outside to form a curved chute-like structure, and shaped on the inside to direct the flow of material to be transferred while minimizing the impact of the material on the chute. Each element preferably has a horizontal rib so that the spaces between the ribs of adjacent elements can fill up with material, thereby providing a rock box-type of sliding surface.

The elements are mounted on side tracks or rails in the support structure to allow the positions of the elements to be shifted intermittently as they wear. In general, an unworn element is initially installed at the top of the chute, and as it wears it is shifted sequentially along the tracks or rails. After it reaches the last position and has become thoroughly worn it is removed from the bottom of the chute and discarded. Thus the chute is constructed in practice of a number of separate elements initially identical to one another. At any given time the elements are worn to varying degrees according to their respective locations in the chute.

The support frame holds each element at points on each side of the element. The bottom element is supported at a center point as well, and holds the upper elements in position. One method of changing the position of the elements is to lock the next to last element in position, so that the elements above it are supported within the frame. The support piece for the lowest or last element is then removed, allowing this element to be dropped out of the frame onto a lower support piece for removal. The support for the last element is then repositioned and the next to last element unlocked to allow it and the other elements above it to fall down into their new positions. A new element is then placed at the top of the chute.

The above procedure for replacing an element can be followed on the top chute positioned above the bottom chute in the two-chute transfer system as well as on the bottom chute by positioning the lower chute on a parallel railed structure which can be rolled away from the top chute. A mechanism for locking the lower chute onto the rails incorporates an adjustment for fine tuning the chute during operation.

By mounting the top chute of the two-chute transfer system on a pivoted structure, adjustments to the point of impact of the load from the top chute into the bottom chute may be made by: (1) rotating the top chute about its center of curvature; (2) translating the top chute relative to a head pulley; and (3) translating the top chute and the head pulley together.

Figure 2:
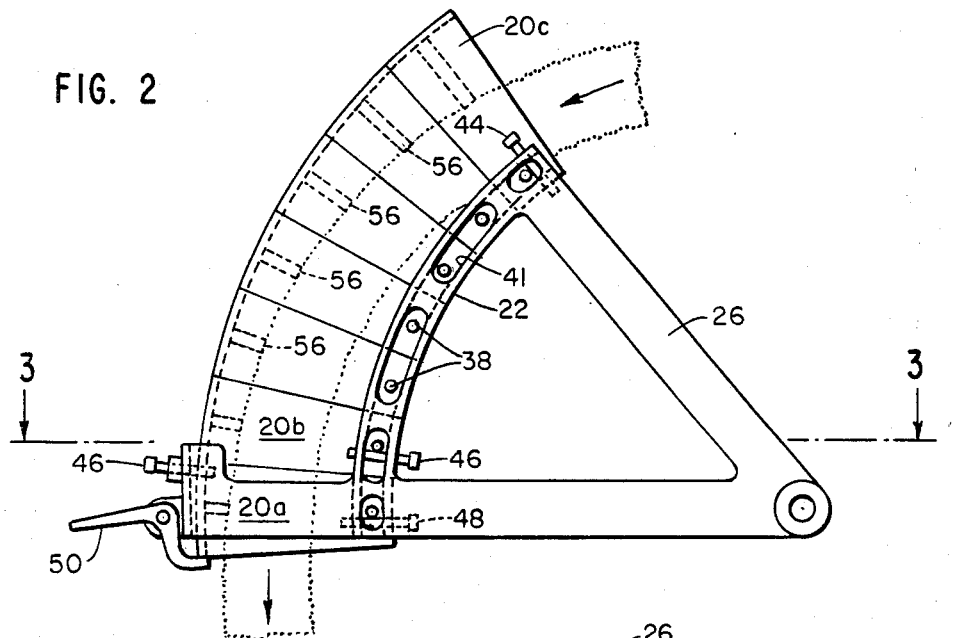
FIG. 2 is a side elevation of the upper chute of the transfer system of FIG. 1, illustrating a presently preferred support structure for shifting the elements.
Figure 3:
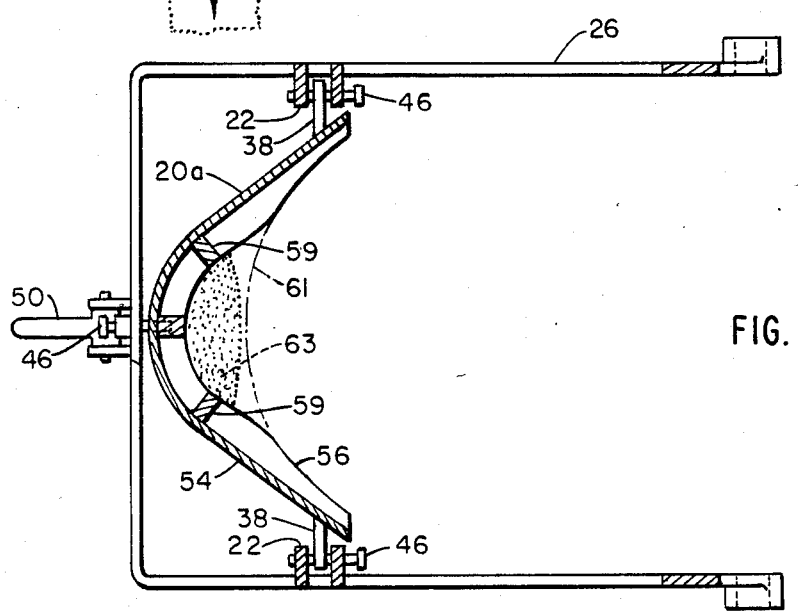
FIG. 3 is a sectional plan view of the upper chute of the transfer system of FIGS. 1 and 2 taken at line 3—3 of FIG. 2, showing the rib shape of an unworn ribbed element, the rib shape of a fully worn ribbed element, and a typical outline of the cross section of a material load.
Figure 4:
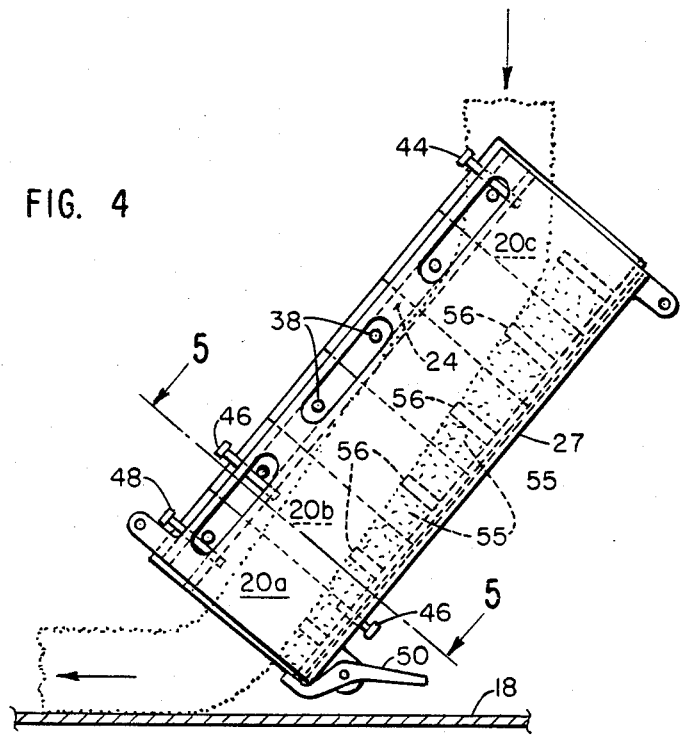
FIG. 4 is a side elevation of the lower chute of the transfer system of FIG. 1.
Figure 5:
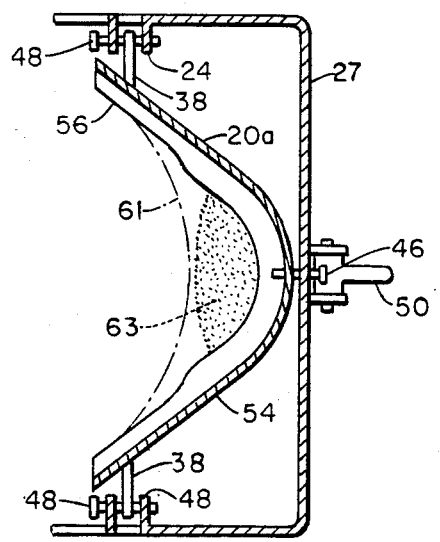
FIG. 5 is a sectional plan view taken at line 5—5 of FIG. 4 showing the shapes of an unworn ribbed element, a fully worn ribbed element, and a typical outline of the cross section of a material load.

FIG. 1 is a side elevation of a transfer system shown generally at 10 and comprising an upper chute 12 and a lower chute 14 positioned relative to each other to provide for transfer of a bulk material from an upper conveying belt 16 to a lower following or receiving belt 18. For convenience of illustration, the belts are shown as moving in parallel directions; however, it will be clear from the description to follow that the belt directions may subtend any desired angle as viewed in plan. Each transfer chute 12 and 14 consists of a plurality of elements 20 which are arranged contiguously in sequence along supporting slotted channel shaped frames, tracks or brackets 22 and 24, respectively. As shown in FIGS. 1 to 3, the upper chute frames 22 are mounted on a forked pivotal yoke 26. As shown in FIGS. 1, 4 and 5, the lower chute frames are supported by a yoke 27 adjustably fastened to a movable parallel support structure 28. A turnbuckle 30 is used to adjust the angular position of the upper pivotal yoke 26. The angle of the lower unit 14 is adjusted by raising or lowering pivot support pieces 32 which are adjustably movable in slotted parallel tracks 34.

Figure 6:
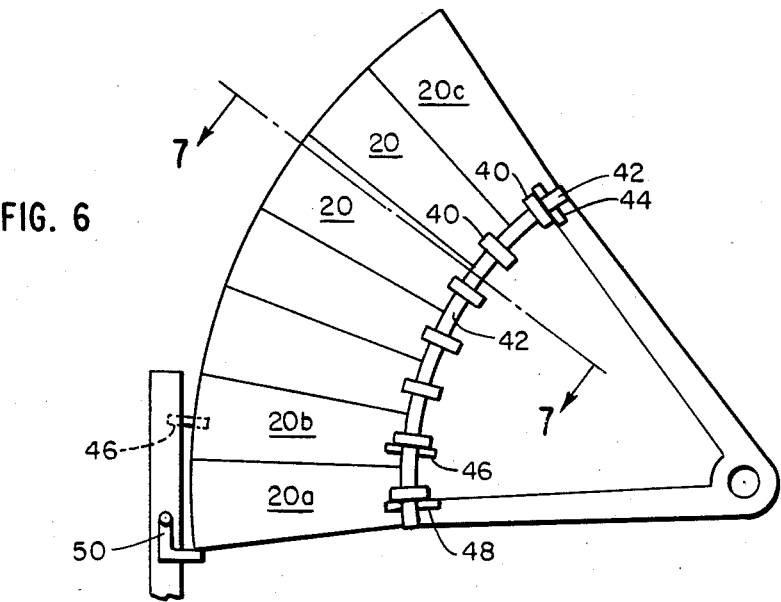
FIG. 6 is a side elevation of a top chute for a transfer system incorporating an alternative form of the side support frame and brackets.
Figure 7:
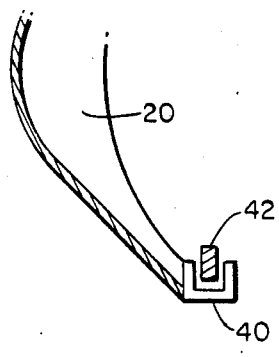
FIG. 7 is a view in section of an element in the chute of FIG. 6 taken along line 7—7 thereof and showing the channeled support brackets.

As is most clearly shown in FIGS. 3 and 5, the elements 20 have studs 38 at their sides which project into the channel frames. In another embodiment, shown in FIGS. 6 and 7 and further described below, the elements 20 are provided with integral channel-shaped brackets 40 at each side, which are slidable on solid track support frames 42.

The elements 20 are held in abutting relationship on the supporting frames 22 and 24 by pins 44, 46 and 48 securing the top, second-to-bottom, and bottom elements, respectively, in place. A latch arm 50 supports the center of the bottom element 20a. Element 20b, immediately above the bottom element 20a, is secured by another pin 46. Assuming the parts to be initially in the positions illustrated in FIG. 1, for example, the bottom element 20a is removed by releasing the latch 50 so that the elements above it will be supported by the pins 46, then withdrawing the pin 48 and releasing the latch 50 to allow the element 20a to fall out, then returning the latch 50 to its illustrated position, then withdrawing the pins 46 to allow the other elements to move down until restrained by the latch.

As is shown in FIGS. 3 and 5, each element 20 consists of a generally rounded V-shaped steel outer shell 54 to which is welded a rib 56 which is worn away in use by the impact of the incoming material. As shown in FIGS. 1, 2 and 4, the trajectory of the incoming material is altered by its impact on the chute elements which in turn is governed by the depths of the ribs 56. When the chute is first put in use, preferably the ribs of the respective elements have been cut back progressively according to the degree of wear which correspond to their respective positions in the chute. After the elements 20 have been worn to a predetermined extent they are shifted towards the bottom of the unit 12 or 14, a new, unworn element 20c is placed at the top and the most worn element 20a is removed from the bottom. The advantages of this arrangement for adding only identical replacement elements at certain time intervals are realized in terms of reduced cost and time required for replacement or maintenance.

To minimize wear, the radius of curvature in the central rounded portions of the ribs 56 is approximately 1/6 the width of the belts 16 and 18. The height of the ribs controls the quantity of the flowing material that is retained thereby, as shown at 55, to achieve the desired rock box effect. The thickness of the ribs 56 depends upon the properties and flow rate of the material being transferred. The more steel there is in contact with the flowing stream, the lower the friction. Accordingly, a sticky material may require thick ribs 56 at close spacing, whereas an abrasive ore with a high flow rate may dictate using thinner ribs 56 with less steel exposed to the flowing material.

As shown in FIG. 3, gusset plates 59 may be provided to reinforce the ribs 56.

FIGS. 3 and 5 show in full lines the shapes of the inner or free edges of the fully worn ribs, and by broken lines 61 the shapes of new, unworn ribs. Broken lines 63 illustrate cross sectional outlines of typical material as centered and directed by the shaped elements 20. The shapes of the unworn elements 20 are generally designed using the dimensions of the material load on the horizontal conveying belt 16 and the width of the belt 16. The overall width of the elements 20 is approximately equal to the width of the belt 16.

As shown in FIG. 1, the outline of the material stream is depicted at 65, and broken lines 67 depict the free-fall outline of the stream, that is, the outline of the stream if the chute units were not in place. Preferably, the upper chute is adjusted so that the outlines 65 and 67 are tangential to one another at the leading or free edge of the rib 56 on the uppermost element 20c.

As shown in FIGS. 2 and 4, the same general design of elements 20 is used with the lower chute 14 as with the upper chute 12. However, the support means 28 for the lower chute provides for a straight line rather than a curved flow of material. As in FIG. 3, FIG. 5 shows that the ribs of the initial elements 20c have a larger radius of curvature than do the worn elements 20a at the bottom of the transfer chute.

The height between the leading belt 16 and following belt 18 should be chosen so as to maintain the solid velocity at approximately belt speed. This means that the energy loss from impact and sliding on the chutes 12 and 14 should equal the energy gain from the fall height between the belts. The distance along the chute 14 surface from the point of impact of the material to the end of the chute 14 can be varied by adjusting the position of that chute. This provides control of the velocity of material exiting the two-chute transfer system 10. When sticky material is handled, the bottom chute 14 will be rolled back to compensate for the cohesive forces slowing the flow of material in the chute. When abrasive or lumpy material is handled, the chute 14 will be adjusted forward to slow the material down and protect the following belt 18.

As described above, the elements 20 within the chutes are placed to receive the material at a point essentially tangential to the free-fall trajectory of the material stream and gradually to change the direction of the stream so that it maintains its momentum, thereby reducing tendencies for the chutes 12 and 14 to clog with sticky solids, entrain air or cause dusting of the materials. The vertical spacing between the upper 12 and lower 14 chutes in the transfer system is adjusted to maintain material speed. The elements 20 are also shaped to direct the stream of material essentially at the receiving belt 18 velocity and onto the receiving belt 18 center line.

The gap between the bottom chute 14 and the following belt 18 allows material collected at a belt scraper to be placed on the following belt 18 ahead of the lower unit 14. This distance may be increased to clear a load placed on the following belt 18 ahead of the chute 14. The gap should be kept at a minimum to minimize impact on the following belt 18.

Both the upper and lower chutes in the transfer system may be enclosed to contain dust that may be generated by the transfer. Because the direction of the flowing stream is changed gradually as it moves through the chute, dusting is minimized. Skirt plates may be required on the following belt 18 to control bouncing of large lumps. A conical deflector plate may be positioned above the upper chute 12 to protect the rib 56 in the top element 20c from large lumps. A deflector plate may also be positioned at the base of the upper chute 12 to aid in directing material into the bottom chute 14.

Although this invention has been described with reference to specific embodiments, it will be evident that modifications and variations may be employed by those skilled in the art. It is intended that all such modifications and variations be included within the scope of the appended claims.

We claim:

1. A transfer chute for transferring a stream of bulk particulate material falling with a horizontal component of velocity from a first conveyor to a second conveyor comprising, in combination,
    a support frame extending along a path between the first conveyor and the second conveyor,
    a plurality of replaceable abutting elements each supported by and downwardly shiftable along the frame, each element comprising a sheet curved for lateral confinement of the stream and a rib projecting from the sheet for retaining a portion of the material in position to absorb the impact of the stream, and
    means to restrain the elements from shifting along the frame and being adapted to release selectively an end element for removal and to permit downward shifting of the remaining elements to provide a space at the other end of the frame for insertion of a replacement element.

2. A transfer chute according to claim 1, in which a portion of said path between the first conveyor and the second conveyor has a greater curvature than the free-fall path of the stream.

3. A transfer chute according to claim 2, in which a portion of said path between the first conveyor and the second conveyor is substantially rectilinear.

4. A transfer chute according to claim 2, in which said path between the first conveyor and the second conveyor is substantially tangential to said free-fall path at the free edge of the rib on the uppermost element.

5. A transfer chute according to claim 1, in which the support frame comprises a pair of channel members and each element has a pair of side portions each extending into and displaceable along one of said channel members.

6. A transfer chute according to claim 1, in which the support frame comprises a pair of bars and each element has a pair of channel-shaped side portions each receiving and displaceable along one of said bars.

7. A transfer chute according to claim 1, with means for rotating the support frame about a horizontal axis.

8. A two chute transfer system for transferring a stream of bulk particulate material falling with a horizontal component of velocity from a first conveyor to a second conveyor comprising, in combination, a first chute and a second chute,
    each of said chutes comprising
    a support frame,
    a plurality of replaceable abutting elements each supported by and downwardly shiftable along the frame, each element comprising a sheet curved for lateral confinement of the stream and a rib projecting from the sheet for retaining a portion of the material in position to absorb the impact of the stream, and
    means to restrain the elements from shifting along the frame and being adapted to release selectively an end element for removal and to permit downward shifting of the remaining elements to provide a space at the other end of the frame for insertion of a replacement element,
    wherein the support frame of the first chute extends along a first path between the first conveyor and the second chute and has a greater curvature than the free-fall path of the stream and the support frame of the second chute extends along a second path between the first chute and the second conveyor.

9. A transfer system according to claim 8, in which the second path is substantially rectilinear.

10. A two chute transfer system according to claim 8, in which said first path is substantially tangential to said free-fall path at the free edge of the rib on the uppermost element of said first chute.

11. A two chute transfer system according to claim 8, in which each support frame comprises a pair of channelled members and each element has a pair of side portions each extending into and displaceable along one of said channelled members.

12. A two chute transfer system according to claim 8, in which each support frame comprises a pair of bars and each element has a pair of channel-shaped side portions each receiving and displaceable along one of said bars.

13. A two chute transfer system according to claim 8, with means for rotating at least one of the support frames about a horizontal axis.

* * * * *